US005512933A

United States Patent [19]

Wheatley et al.

[11] Patent Number: 5,512,933

[45] Date of Patent: Apr. 30, 1996

[54] IDENTIFYING A RECEIVED PROGRAMME STREAM

[75] Inventors: Mark A. Wheatley, Maidenhead; Peter Wilcox, Roehampton, both of United Kingdom

[73] Assignee: Taylor Nelson AGB plc, London, United Kingdom

[21] Appl. No.: 135,054

[22] Filed: Oct. 12, 1993

[30] Foreign Application Priority Data

Oct. 15, 1992 [GB] United Kingdom .................. 9221678

[51] Int. Cl.[6] ............................ H04N 7/00; H04N 17/00

[52] U.S. Cl. ........................................ 348/5; 348/1; 455/2

[58] Field of Search ................................ 348/1–5; 455/2; H04N 7/00, 17/00, 17/04, 17/06

[56] References Cited

U.S. PATENT DOCUMENTS

| | | |
|---|---|---|
| 3,806,805 | 4/1974 | Wall . |
| 3,919,479 | 11/1975 | Moon et al. . |
| 4,230,990 | 10/1980 | Lert, Jr. et al. . |
| 4,420,769 | 12/1983 | Novak . |
| 4,450,531 | 5/1984 | Kenyon et al. . |
| 4,511,917 | 4/1985 | Kohler et al. . |
| 4,622,583 | 11/1986 | Watanabe et al. . |
| 4,677,466 | 6/1987 | Lert, Jr. et al. . |
| 4,697,209 | 9/1987 | Kiewit et al. . |
| 4,723,302 | 2/1988 | Fulmer et al. . |
| 4,730,214 | 3/1988 | Lambert et al. . |
| 4,739,398 | 4/1988 | Thomas et al. . |
| 4,740,841 | 4/1988 | Slavin . |
| 4,750,213 | 6/1988 | Novak . |
| 4,843,562 | 6/1989 | Kenyon et al. . |
| 4,857,999 | 8/1989 | Welsh . |
| 4,858,000 | 8/1989 | Lu . |
| 4,885,632 | 12/1989 | Mabey et al. . |
| 4,918,730 | 4/1990 | Schulze . |
| 5,019,899 | 5/1991 | Boles et al. . |
| 5,210,820 | 5/1993 | Kenyon . |

FOREIGN PATENT DOCUMENTS

| | | |
|---|---|---|
| 0195639 | 9/1986 | European Pat. Off. . |
| 0367585 | 11/1988 | European Pat. Off. . |
| 2559002 | 1/1984 | France . |
| 2138642 | 10/1984 | United Kingdom . |
| 9111062 | 7/1991 | WIPO . |

OTHER PUBLICATIONS

Matsui et al., "High-Speed Transmission of Sequential Freeze-Pictures by Extracting Charged Areas" IEEE Transaction on Communications vol. COM-29 No. 12 Dec. 1981 pp. 1977–1981.

*Primary Examiner*—David E. Harvey
*Attorney, Agent, or Firm*—Emrich & Dithmar

[57] ABSTRACT

A system for identifying a program stream being displayed at a receiver location comprises means at a central station for measuring the relative luminance of a plurality of predetermined areas in each frame and recording that data with their times of occurrence for each of a plurality of program streams as reference data, and means at a receiver location to measure the relative luminance of the same areas but at a repetition rate less than that at the central station for a given time after a channel change and thereafter at an even lower repetition rate and storing the measurements at the receiver location with times defining corresponding broadcast times, and means for transmitting the stored data to the central station for correlating the measured and reference data using the recorded times to access the corresponding measured values of the recorded and reference data.

35 Claims, 12 Drawing Sheets

IDENTIFYING A RECEIVED PROGRAMME STREAM

This invention relates to a means of identifying a programme being displayed by a domestic receiver, for example for the purposes of television audience ratings measurement.

Since the terms "channel", "programme" and "station" have become rather debased and are commonly used interchangeably, throughout this document the term "programme stream" will be used to mean a particular sequence of television material transmitted or relayed by a given broadcaster, for example BBC1, Central Television, Channel 4 etc. This is irrespective of the delivery mechanism (cable, terrestrial broadcasting, satellite broadcasting etc.) employed or the specific communications channel used. The term "programme" is used conventionally, as in Coronation Street or Eldorado.

Conventionally ratings measurement systems have identified programmes being viewed by determining their delivery mechanism, channel, and date and time of transmission. Given knowledge of channel allocations in the locality of the receiver and a programme transmission schedule, the programmes viewed on a given television receiver at a given time can then be determined.

Determination of the source of the programme can mean monitoring the tuning of several devices in a home. Consider the case where a television receiver (TV) is tuned to the output of a video cassette recorder (VCR) which is not playing a tape but is in turn tuned to the output of a satellite receiver. By determining the channel to which the satellite receiver is tuned it is then possible to trace the identity of the channel being watched on the TV. However, the monitoring equipment required is complex, as is its installation. Note too that the VCR must be monitored even if identification of time-shifted material is not required, since live material may be viewed via the VCR.

To extend the technique to viewing of recorded material, it is possible to connect a device to the VCR to record, alongside the video and audio signals, information about the time, date and source (channel) of the recording. This information can be recovered on playback so that, Given knowledge of channel allocations in the locality of the VCR and a programme transmission schedule for the date of recording, the programmes played back can be determined.

In addition to the complexity of the monitoring equipment and its installation procedures, difficulties with this approach stem from the increasing diversity of methods of delivery of TV signals into the home, and the ever-increasing sophistication of TV's, VCR's, satellite receivers etc. The former can mean tracing the signal through three or four devices, sometimes located in different rooms in the home, in order to determine the source of the signal being watched on TV. The latter means that no single technique is appropriate for determining the tuning and source selection of all types of TV and related devices on the market. This necessitates continual enhancements of the monitoring equipment in order to keep pace.

The present invention has been evolved during research into the provision of means of determining which programmes are viewed which requires only the TV to be monitored, plus the VCR if (and only if) viewing of time-shifted material is to be measured. Moreover consideration has been given to designing a monitoring equipment installation procedure which is greatly simplified compared to most current monitoring techniques.

According to one aspect of the invention, there is provided a method of identifying a programme displayed by a television receiver comprising: (a) at a remote station, monitoring a programme stream by measuring a predetermined parameter of the stream repetitively and storing the resulting measurements and associated time-of-receipt data as reference data; (b) at the location of the television receiver measuring the same parameter of a displayed programme stream repetitively, and at a rate less than that at the remote station, and recording the measured parameters and associated time data; (c) transmitting the recorded measurements and time data from said location to a remote station; and (d) comparing the transmitted measurements and time data with the reference data to identify a correlation therebetween.

In a preferred embodiment, there are means at the location for detecting a channel change and means for reducing the repetition rate at the location from a predetermined instant after detected channel change.

According to another aspect of the invention, there is provided a method of determining usage of a receiver for selectively receiving a plurality of programme streams, the method comprising: (a) providing reference data comprising a sequence of measurements of a programme stream parameter of a selected programme stream, those measurements being taken at known positions throughout a segment of the stream and the reference data including time information defining the times of broadcast of those portions of the stream upon which the measurements have been made; (b) monitoring a programme stream being received by the receiver and making local measurements of said parameter at at least some of said known positions, whereby the time of broadcast of each stream portion relating to the measurements is known; and (c) comparing the local measurements with, in each case, that one of reference data measurements having the same position in the stream and substantially the same time of broadcast.

Where the receiver receives a programme stream directly, the time of receipt may be used to define the broadcast time.

Where the receiver receives a stream via a recording device, means are preferably provided at the recording device to define time of receipt thereat, i.e. broadcast time, and the method may use that time instead of time of receipt at the receiver to define broadcast time.

It will be apparent, therefore, that a method of identifying programme stream and time of receipt is provided which utilises time, as well as information for searching in the reference data for a correlation, to identify a stream, thus to enable a direct comparison, measurement by measurement, between local and reference data and so avoid a search throughout the reference data relating to a stream. It is known to record time for the purpose of obtaining information as to how long an identified channel or stream has been received. This aspect extends the use of time to simplify the channel or stream identifying process.

In one application, for defining at a receiver which programme is being viewed, e.g. to prompt the user on or during receipt of the programme, one can download at the receiver location the reference data relating to the stream segment corresponding to the programme and provide means at that location to seek the correlation.

In the case of generally determining user habits, the reference data will pertain to a plurality of programme streams and the local data may be collected at a plurality of receivers for comparison with the reference data later, i.e. not in real time. This is possible owing to the use of time as a search and correlation factor. In one embodiment, identification of the stream viewed, and in particular the segment or programme being received, is not found at the home but at a central site and then only by comparing the results of the correlation with a programming schedule.

As already indicated and in a preferred embodiment of this aspect, at the receiver location measurements are taken at only some of the known positions in order to limit the amount of data that need be obtained at the receiver location.

In all the above aspects, these systems may advantageously operate with programme streams the signals of which are constituted by regularly occurring sections and the known positions are known in relation to the beginning of each section, so that there can be a relatively small number of known positions. A television signal is one such signal wherein a field or frame can constitute a section, such sections being defined by synchronising signals included in the programme stream. The relevant times used for searching need thus only be, for example, the section beginning times rather than the times of the actually measured signals within a section.

In the case of a television signal, the parameter may be the average intensity of those portions of the video signal which, at a receiver, define a given screen area, thus giving, for example if processed through a low pass filter, the average luminance of that area. The area in each case has a predetermined position in each field or frame. In alternatives, the video signal could be processed to measure chrominance, amplitude of a particular colour or the relative amplitudes of two colours. As a preferred case, relative luminance is obtained as the parameter, i.e. the average luminance of that area compared to the average luminance of another area of the screen, preferably of the same field or frame. This may be achieved by measuring the average luminance of two such areas and by comparing the two to define which is greater. One thus obtains binary information defining which of the two 'greater than' states exists. As the positions of the two areas have predetermined positions regardless of the stream concerned, the two measurements may well be very close in value. In a preferred embodiment, means are provided to detect values within a given range and to flag such results. The comparison process can then ignore any correlation or lack of correlation in relation to such results. In one embodiment, only the reference data has its measurements so flagged for unreliability, to reduce the amount of data that need be obtained at the home.

Thus, according to a further aspect of the invention, there is provided a method of encoding a television programme stream and which comprises forming encoded data as a series of results which are, in each case, the result of the comparison of signal portions corresponding to two distinct areas of a screen, and providing a flag for each result to define whether or not the two areas differ by more than a predetermined amount.

There is thus possible a TV programme stream encoding process involving measuring a property such as luminance or relative luminance at each of a set of known, but irregularly spaced, positions throughout a stream section defined by TV sync signals, this set being measured in each section at a central data collection site to define that programme stream. The data includes time-of-receipt data from which the time-of-receipt pertaining to each measurement can be obtained or derived.

As indicated above, at the local receiver, data compression may be employed. Assume that there are n measurements (or n pair comparisons) per section (e.g. field or frame). This gives a certain, known, data collection rate corresponding to n per section. At the local receiver, the preferred embodiment has a lesser rate of n/x per section, averaged over many sections, where x is relatively large compared with n, e.g. may be as much as 1024 when n is, say, 32. In this preferred embodiment x is switchable between two values, one much less than the other, e.g. 256, but still much larger than n. The lesser value of x is selected on a detected channel change to achieve a quick detection of channel, and after one full section x is switched to the larger value, sufficient to enable the central site to monitor the stream against the programme stream concerned in order to check whether or not the receiver stayed tuned to the detected stream or channel.

For example, according to another aspect of the invention, a preferred apparatus, for encoding a programme stream displayed a% a TV receiver, comprises means for measuring the signal of the stream to define values corresponding to n distinct screen positions of a field (or frame), those means being arranged to collect a sequence of substantially complete sets of n values corresponding to respective ones of the n positions, where, on average over the sequence, there are n values every x fields (or frames), where x is not less than n.

It will be apparent from the above that, by the capture of encoded data obtained from the program content of programmes in a programme stream together with time of receipt, it is possible to determine time and stream without relying on additional codes or markers in a programme stream, without relying on so-called 'events' (e.g. blank screens), and without any means of channel detection as such at the receiver. It moreover readily becomes possible to ascertain time and stream of a recording later played back via the receiver.

Thus, according to yet another aspect of the invention, there is provided apparatus for monitoring a receiver and comprising means for encoding the programme content of a stream during its receipt, timing means for including current time-of-receipt data in the encoded data, insertion means, for coupling to a recording device, to insert into the signal received by the recording device time-of-receipt data, which time data will be recorded with any recording made of the signal, and means for deactivating the inclusion of the current time-of-receipt data in the encoded data when earlier time data is found in a signal from the recording device, whereby the data extracted will include original-time-of-receipt data.

The insertion means is thus preferably coupled ahead of the recording circuitry but after the source selection switching so that insertion occurs in all signals except those played back (which will already contain previously inserted time data). The apparatus can tell from the inserted time that if it is substantially the same as current time, it is not playback and the 'true' current time can be included in the corresponding encoded data. Any small time difference defines an error or offset in the time inserted and can be used to correct inserted times found on playback.

The apparatus may also comprise, for detecting which of more than one program stream at a receiver location is being displayed by virtue of there being more than one video input, means for injecting a distinct signal into each video input, means for detecting the presence of the distinct signal in the displayed stream, and means for using that stream thus identified as being displayed for measurement. There may be means for effecting a wireless coupling with the receiver for looking for the distinct signal.

Finally, it should be noted that aspects of the invention concern not only the methods, and apparatus, set forth above but also the corresponding apparatus, and method, as the case may be.

For a better understanding of the invention and to show how the same may be carried into effect, reference will now be made, by way of example, to the accompanying drawings, in which.

Figure 1:
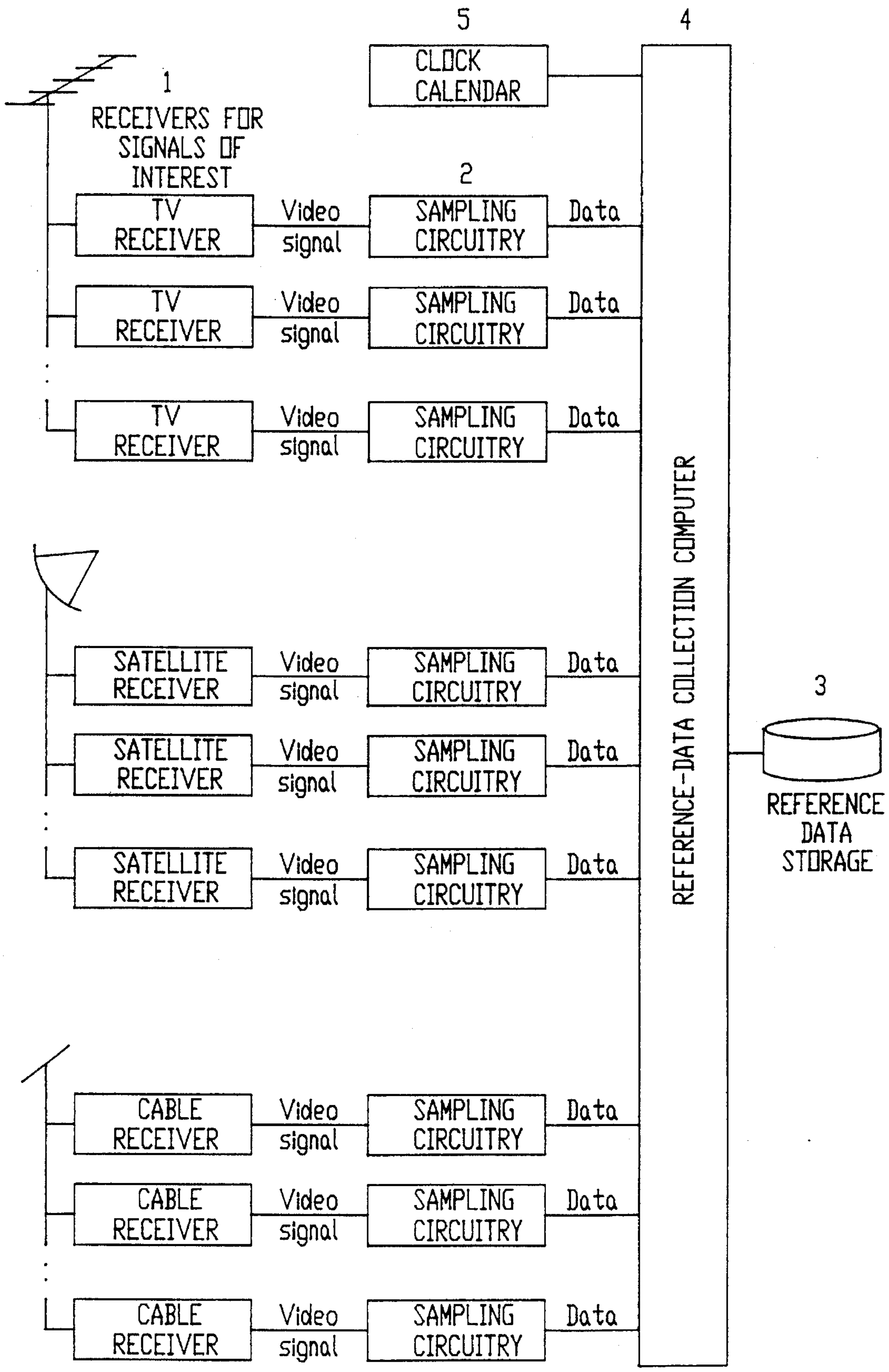
FIG. 1 is a block diagram of a system for the collection and storage of reference data at a central site.
Figure 2:
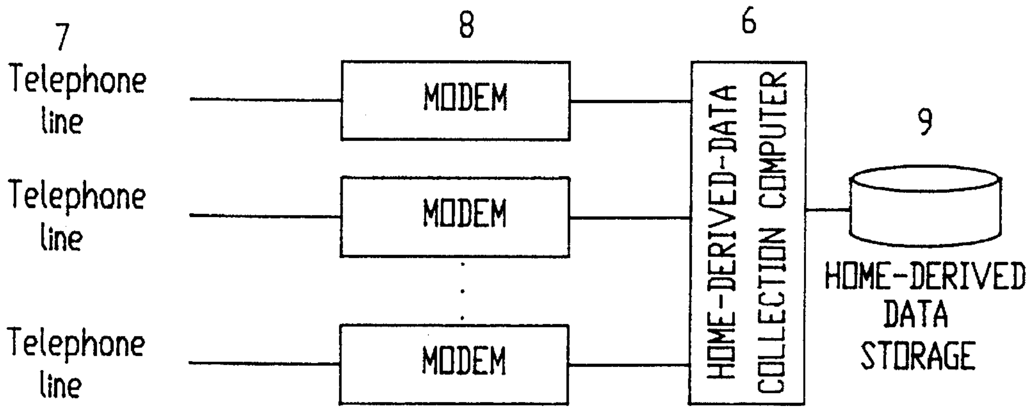
FIG. 2 is a block diagram of the system for the collection and storage of home-derived data at a central site.
Figure 3:
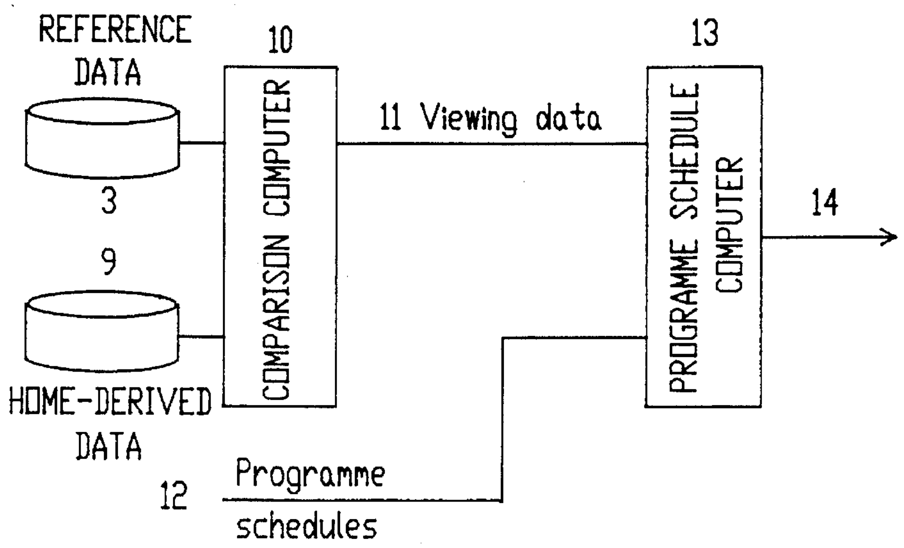
FIG. 3 is a block diagram of the data comparison process leading to final viewing data.

FIGS. 1 to 3 and 8 show schematically a system for monitoring home television receiver usage by the use of (a) in-home equipment (FIG. 8) for obtaining data samples from the receiver; (b) programme reference data collection at a central site (FIG. 1); (c) in-home data collection and storage at the central site (FIG. 2) and (d) the comparison at the central site of the in-home data and reference data (FIG. 3).

In FIG. 1 all TV signals (programme streams) of interest are received by receivers 1 at the central site and a predetermined parameter of the signals is repetitively sampled by sampling circuitry 2, as described later. The receivers 1 are individually tuned to respective channels or programme streams from terrestrial broadcast sources, satellite sources and cable sources. The resulting data are stored at data storage device 3 by a reference data collection computer 4, together with information about the time and date when the samples were taken, as obtained from a clock and calendar device 5. In a preferred implementation, these data are stored for eight days to allow identification of programmes recorded and watched up to a week later.

In this implementation, there is stored (a) the channel concerned, (b) the sampled data and (c) time and date. The channel concerned is stored in that the samples from the receivers 1 are stored in respective files at the storage device 3. The samples are taken at known, but irregular, positions in regular intervals, so the time and date are stored only intermittently, e.g. at predetermined regular intervals of time. The specific time and date of any sample is thus obtained from its position in the interval concerned.

Also in the preferred implementation, the system shown in FIG. 1 may be duplicated to protect against loss of data in the event of equipment failure and may be replicated at several remote sites to collect data on a regional basis if regional broadcasting takes place.

FIG. 2 shows at the central site a home-derived-data collection computer 6 responsible for collecting data samples from in-home monitoring equipment. Each home is called in the early hours of the morning and the data is received via telephone lines 7 and modems 8. These data are stored at a data storage device 9 until such time as the process of comparison with the reference data is completed.

FIG. 3 illustrates a comparison computer 10, together with the stored reference data storage device 3 and home-derived data storage device 9. The comparison process is normally carried out daily, using home-derived data collected early that morning and relating to the previous day's viewing. The output from this system is data 11 recording for each monitored TV which programme stream, if any, was being displayed by the monitored TV at each time of the previous day. Reference to programme schedule information supplied from storage on line 12 enables a programme schedule computer 13 to translate the viewing data 11 into data 14 recording which programmes were being watched at each TV at each time of the previous day.

Especially in the case where viewing of regional broadcasting is to be measured, various combinations of local and/or central collection of reference data, local and/or central collection of home-derived data and local and/or central data comparison may be employed.

Figure 4:
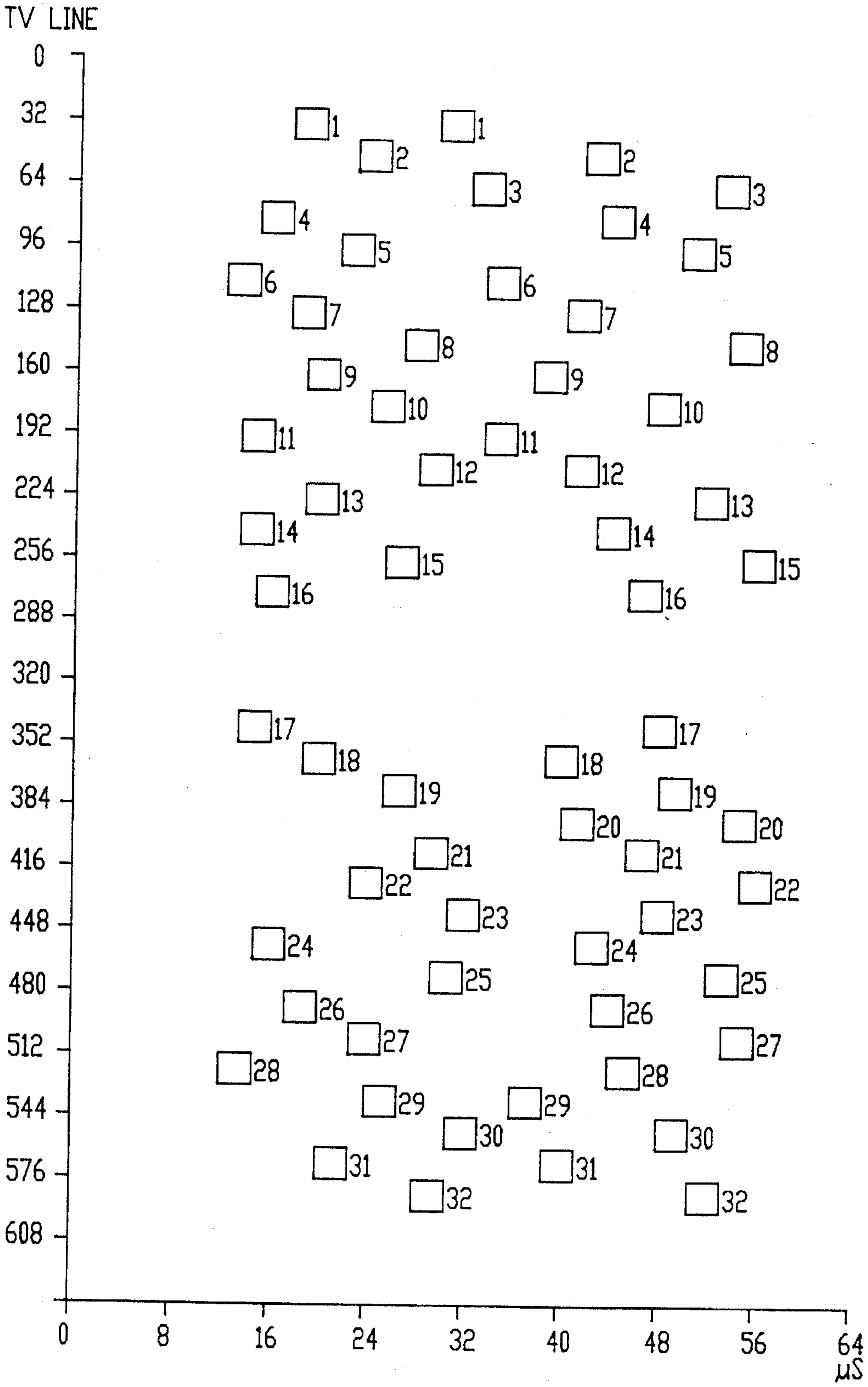
FIG. 4 shows the distribution of sampling areas across a TV picture.

Returning now to the collection of the reference data, each receiver 1 in FIG. 1 derives a standard one volt video signal for each TV channel of interest. Each is sampled as follows. A plurality of pairs of predetermined screen areas, over one frame (two fields), and each 16 scan-lines (within the same field) high by approximately 2.66 microseconds wide are chosen (assuming 625 line 50 Hz TV standard). These may be distributed across each frame as shown in FIG. 4.

The number of pairs is chosen to give good discrimination between similar pictures, especially static pictures (where the time-progression adds no information), without generating excessive amounts of data. In this example there are 32 pairs.

The example size of the screen areas given above is chosen as a compromise. Smaller areas tend to pick out fine detail in pictures and aid discrimination; larger areas tend to reduce susceptibility to noise and Jitter in the signal and sampling circuitry.

Samples are compared in pairs in order to reduce sensitivity to absolute signal amplitude variations between the reference and in-home equipments. The horizontal position of the sample areas is somewhat randomised in order to avoid correspondence with certain geometric aspects of common TV scenes—half light, half dark pictures featuring a doorway or the edge of a building for example. However, areas too close together are avoided since these would often be of the same brightness (because they would tend to be within the same feature of the picture) and therefore would convey less information.

Figure 5:
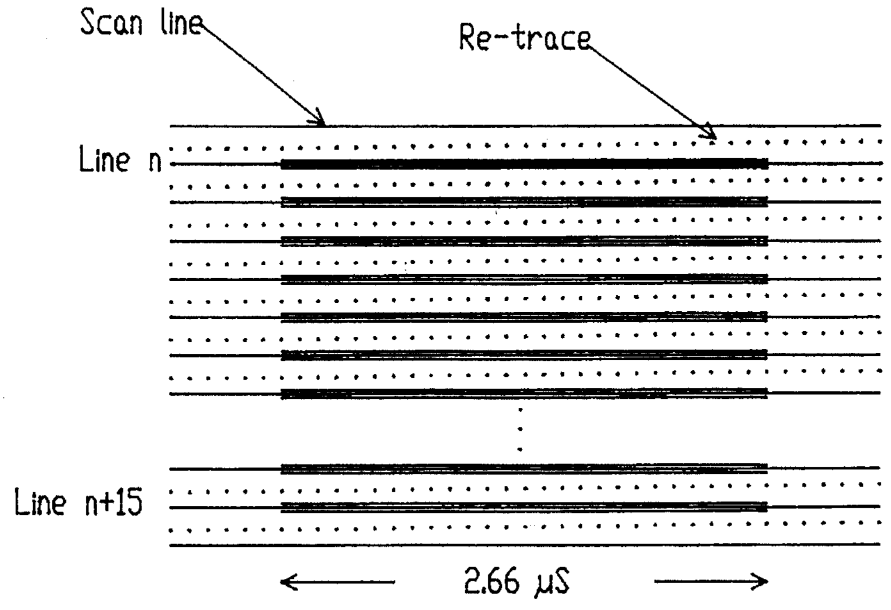
FIG. 5 shows the detail of one sampling area.
Figure 6:
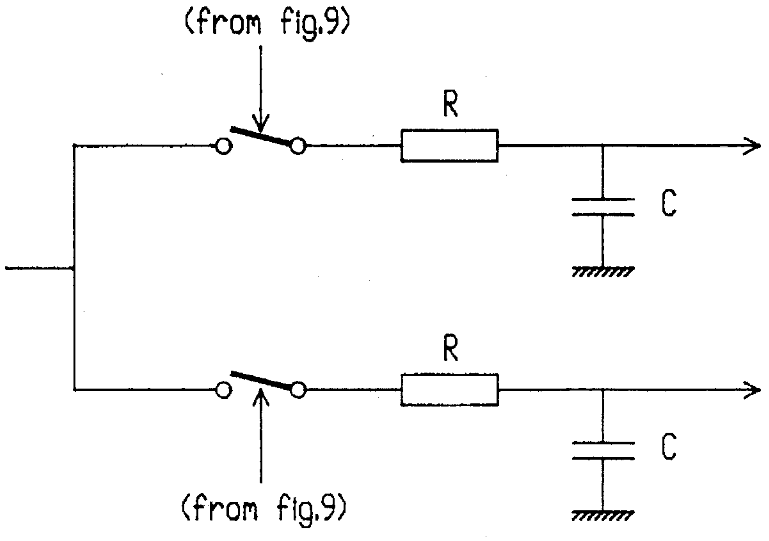
FIG. 6 shows a sample averaging circuit.

Each area is sampled by closing a switch during the time the TV scanning process is scanning that area, the resulting signal passed by the switch being averaged with a time constant of around 33 microseconds. This process is illustrated in FIGS. 5 and 6. FIG. 5 shows a portion of the TV picture as scanned, with the heavy lines indicating the period of closure of the switch and the dotted lines the horizontal retrace. FIG. 6 shows individual switches, resistors R and capacitors C for the left and right samples of the pair, forming a simple gated averaging circuit, of time constant RC, and is used for each of the 32 pairs of samples since these do not overlap in time. The time constant is chosen to provide adequate noise immunity whilst being fast enough to charge substantially during the duration of the scanning of the chosen area. The switch actuating signals are derived by the use of timing means from the line and field synchronisation pulses of the transmission, as will be hereafter described with reference to FIG. 9.

Figure 7:
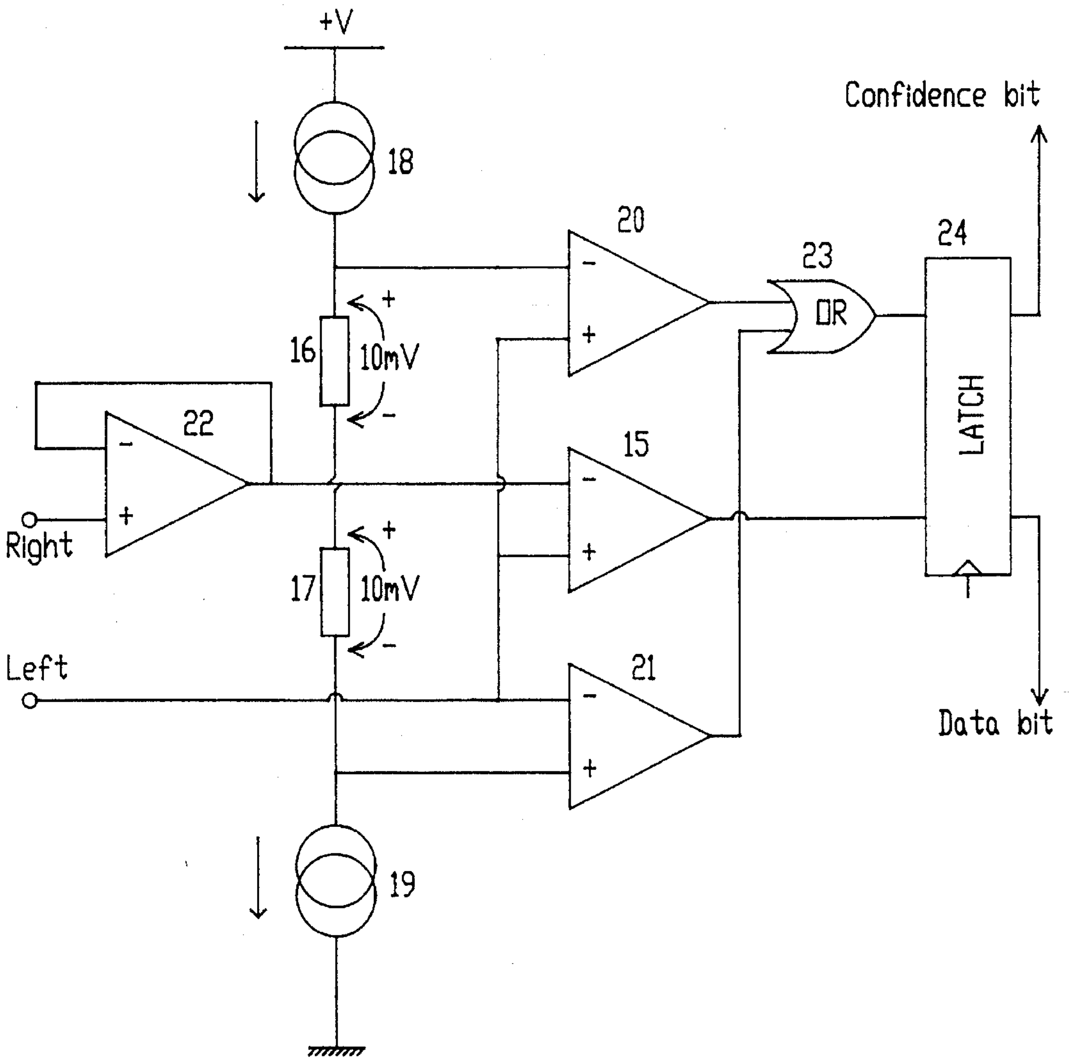
FIG. 7 shows a sample comparison circuit.

The resulting average levels are compared by circuitry shown in FIG. 7. If the left-hand area has a higher average level than the right-hand area then the output of a comparator 15 is high and the resultant data bit is set to '1', otherwise it is cleared to '0'.

If the two levels differ by more than ±10 mV (given a standard one volt video signal), then an associated 'confidence bit' is set to '1', otherwise it is cleared to '0'. This is achieved by providing two resistors 16 and 17 driven by two constant current sources 18 and 19 to generate 10 mV across each resistor. The left-hand level is supplied directly to one input of each of comparators 20 and 21 and the right-hand level is supplied via a unity-gain buffer 22 and the resistors 16 and 17 to the other input in each case. Comparator 20 thus compares the left-hand level with the right-hand level plus 10 mV and will issue a '1' only when the left-hand level is more than 10 mV greater than the right-hand level. Similarly, comparator 21 will only issue a '1' when the right-hand level is more than 10 mV greater than the left-hand level. When a '1' is issued by either comparator 20 or 21, an OR gate 23 generates the confidence bit.

This uncertainty window of ±10 mV is to allow for the inevitable differences between the reference and in-home hardware, and between signals (plus noise) presented to the sampling circuitry at the various locations which might otherwise result in different data bits being derived from nominally identical signals.

The data and confidence bits are latched by a latch 24 at the end of the last scan line of the sample area in each case; line n +15 in FIG. 5. This process is repeated for a total of 32 pairs of screen areas per frame, resulting in 32 data and 32 confidence bits per frame. Operation at frame rate (rather than other possible rates, for example field rate or line rate) is chosen since a frame is the longest (easily detected) period of time into which a TV signal is divided, thus minimising the data rate whilst still allowing easy synchronisation of reference and home-derived data.

Figure 8:
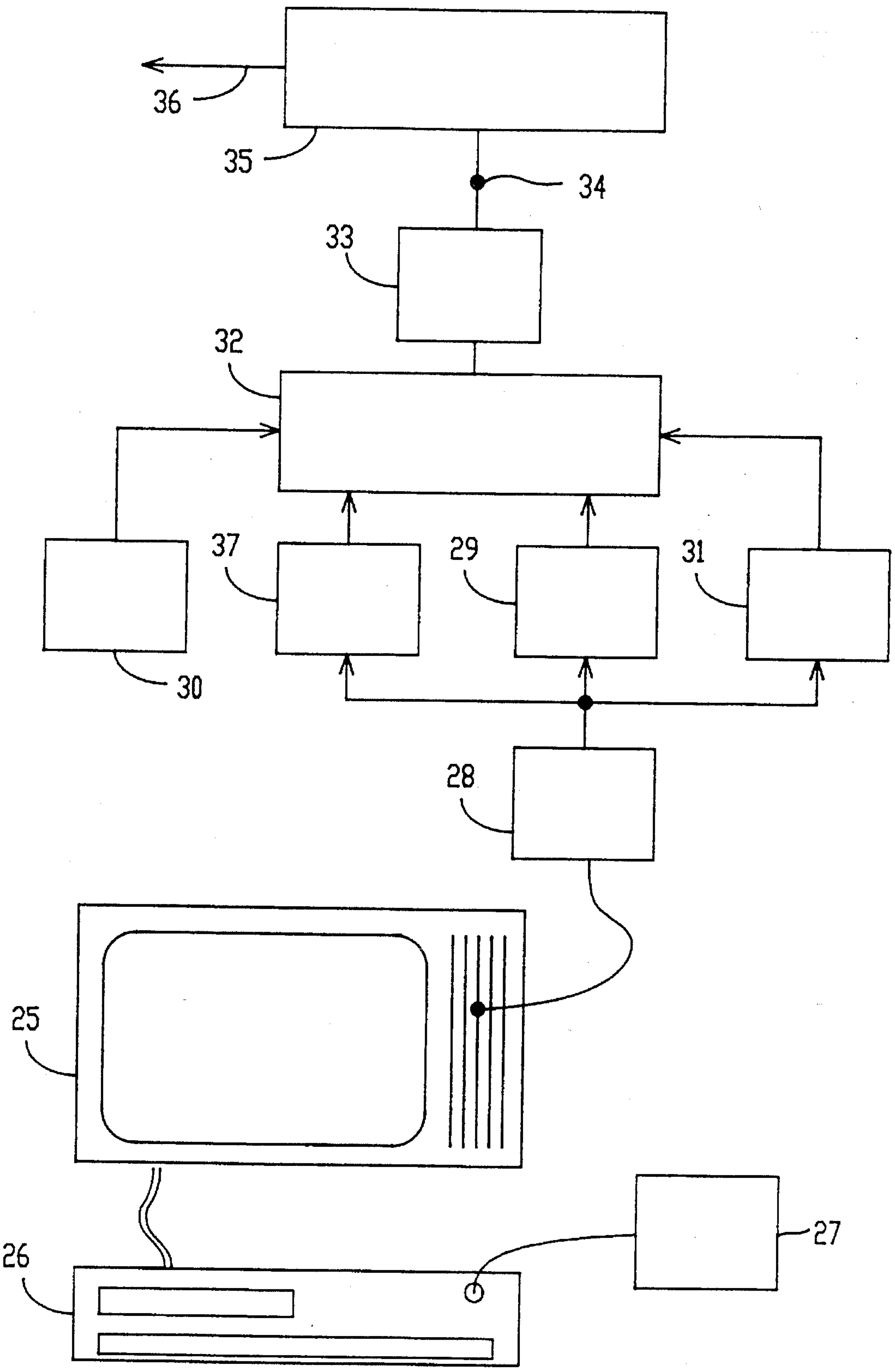
FIG. 8 is a block diagram of in-home equipment.

FIG. 8 shows monitoring equipment deployed in each of a multiplicity of homes for monitoring a TV receiver 25 and a video cassette recorder (VCR) 26. Connected to each VCR is a clock and calendar device with data inserter 27 for inserting the current time and date into each vertical blanking interval of all transmissions passed directly by the VCR to the receiver 25 and to a tape. Thus, such insertion occurs in all modes except playback, not only in the recording mode, i.e. will be received by the receiver whenever it is tuned to the VCR.

The video signal to be sampled and encoded is derived from the TV being monitored either from the video output connector (if fitted) or by internal connection. For isolated-chassis sets this may be a direct connection, otherwise electrical isolation of the signal is required for reasons of safety.

Connected to each receiver 25, if necessary via an electrically-isolating connection 28, is sampling circuitry 29, to be described later, a means 31 of decoding the time and date step incorporated into the video signal by an inserter 27 connected to the VCR, and a channel change detector 37.

These three items are in turn connected to a microprocessor with temporary data storage 32 controlling the in-home equipment. This is also connected to a clock and calendar device 30 and a means 33 of communicating data from the storage 32 via means wiring 34 of the home to a device 35 incorporating further data storage, a modem and a clock for controlling the modem.

The modem is connected to the domestic telephone line 36 in such a way that it can silence the telephones In the home at a predetermined time defined by the clock, in anticipation of a call from the central site's computer. In this way the data can be collected from the home overnight without disturbing the household and without necessitating a dedicated telephone line.

The sampling circuitry 29 in the home is the same as that shown in FIGS. 6 and 7 with the exception that confidence bits are not derived and the data rate is reduced and is controlled by microprocessor 32.

Figure 12:
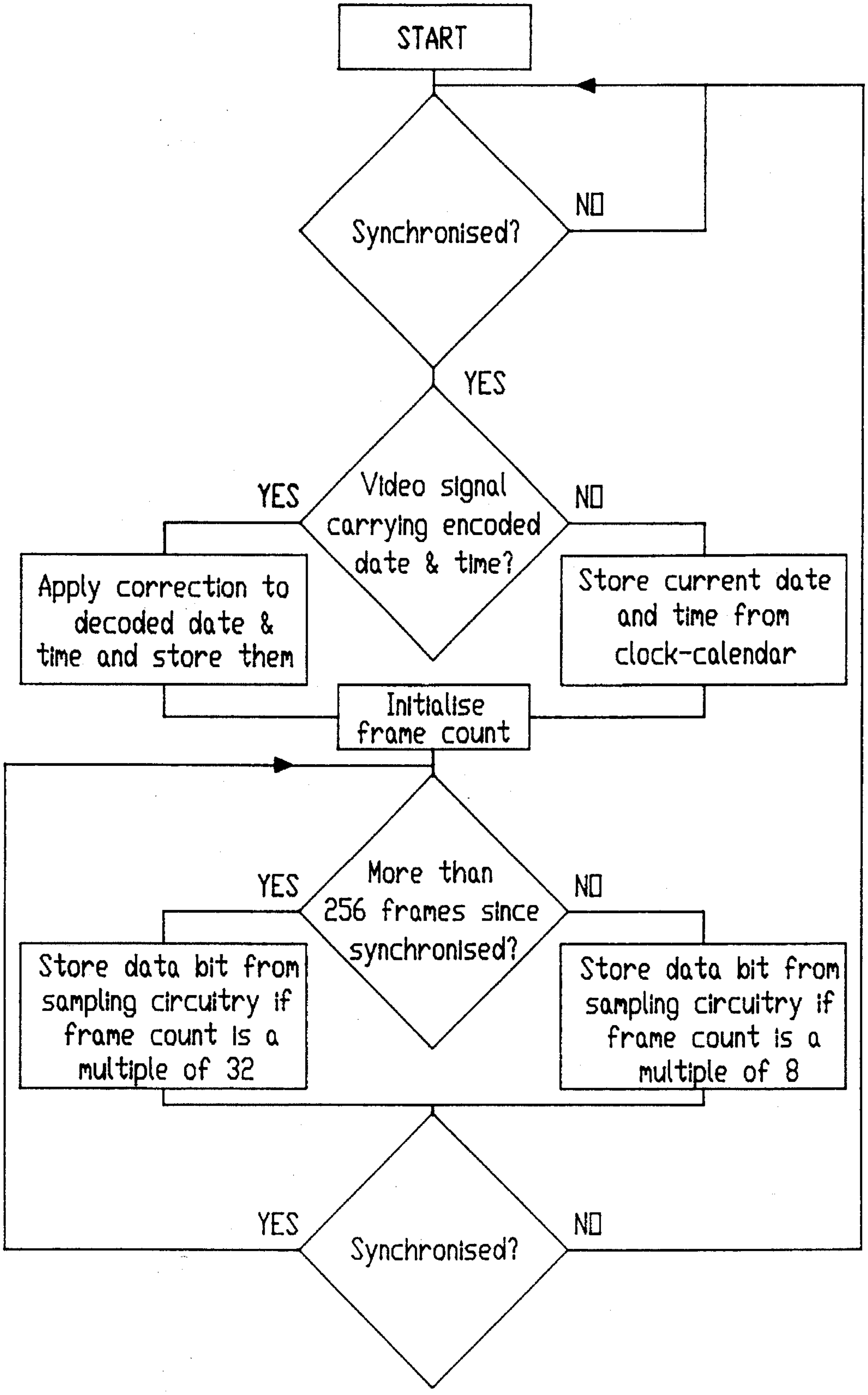
FIG. 12 is a flow chart for the operation of a microprocessor of FIG. 8.

The actions of the microprocessor 32 are shown in full in the flow chart of FIG. 12 and described below in the case where the programme source is not time-shifted material from the VCR 26. How time-shifted material is dealt with is described later.

Following switch-on of the TV, or any subsequent change of programme source (for example a change of channel) as detected by detector 37, the microprocessor 32 stores the output of device 30 and initialises sampling circuitry 29 to cause sampling of the pair of areas denoted 1 in FIG. 4. Thus the first pair of screen areas (at the start of a frame) is sampled and compared and the resulting data bit is stored, along with the time at which this happened.

After eight frames, the second pair 2 of screen areas is sampled and compared and the resulting data bit is stored, and so on every eight frames until all 32 pairs have been sampled, generating a word of 32 data bits after 256 frames. This takes approximately 10 seconds (assuming 625 line 50 Hz TV standard). Thereafter sampling and data storage takes place only once every 32 frames, producing one data bit every 1¼ seconds approximately and the 32 bit data word after each 1024 frames. Time is only stored in this example on detecting switch-on or channel change, times of individual bits being derivable because of the known timing of sampling.

The purpose of the initial higher rate of sampling is to ensure that data is collected quickly enough to give a high probability of uniquely identifying the material being watched within 10 seconds (in case the viewer then changes channel again for example). The purpose of the subsequent low rate of sampling is to ensure that channel changes that are not otherwise detected can be detected from the data without generating excessive amounts of data (to be stored at and recovered from the homes). Another purpose of starting or restarting the sequence after a detected channel change and time and date stamping the resultant data is to allow the centrally collected reference data and that from the in-home equipment to be synchronised.

There are at least two alternatives to the 'rolling sample' technique (starting with samples near the top of frame and working progressively through them). It is possible to sample one pair only, at a fixed location. However, for relatively static pictures this may give little discrimination. It is instead possible (for the same resultant data rate) to sample all 32 pairs in one frame and then again after a period 32 times greater than the preferred technique. This would give good discrimination between static pictures, but would give poor time resolution when determining that an otherwise undetected channel change had occurred. The 'rolling sample' is thus the preferred compromise.

In order to initiate the sampling process at the higher rate, it has been mentioned that, at the in-home monitoring equipment, one detects when the source of the programme being viewed on the TV is changed. This may be as a result of a change in tuning of the TV, a change of video source (tuner versus external video input) or a change in tuning or state (standby, playback etc.) of another device (VCR, satellite receiver etc.) from which the signal is derived.

In each case the monitored video signal is likely to suffer a disturbance of its synchronising pulses, either due to a brief interruption of the signal (as when tuning from one frequency to another) or because the two TV signals are not themselves synchronised. Only when switching electronically at high speed between two synchronised TV signals is this scheme likely to fail, and, as indicated above and as will be described below, the sampling scheme is designed to be able to fail safe and detect the change from the sampled data alone, albeit with degraded time resolution.

Figure 9:
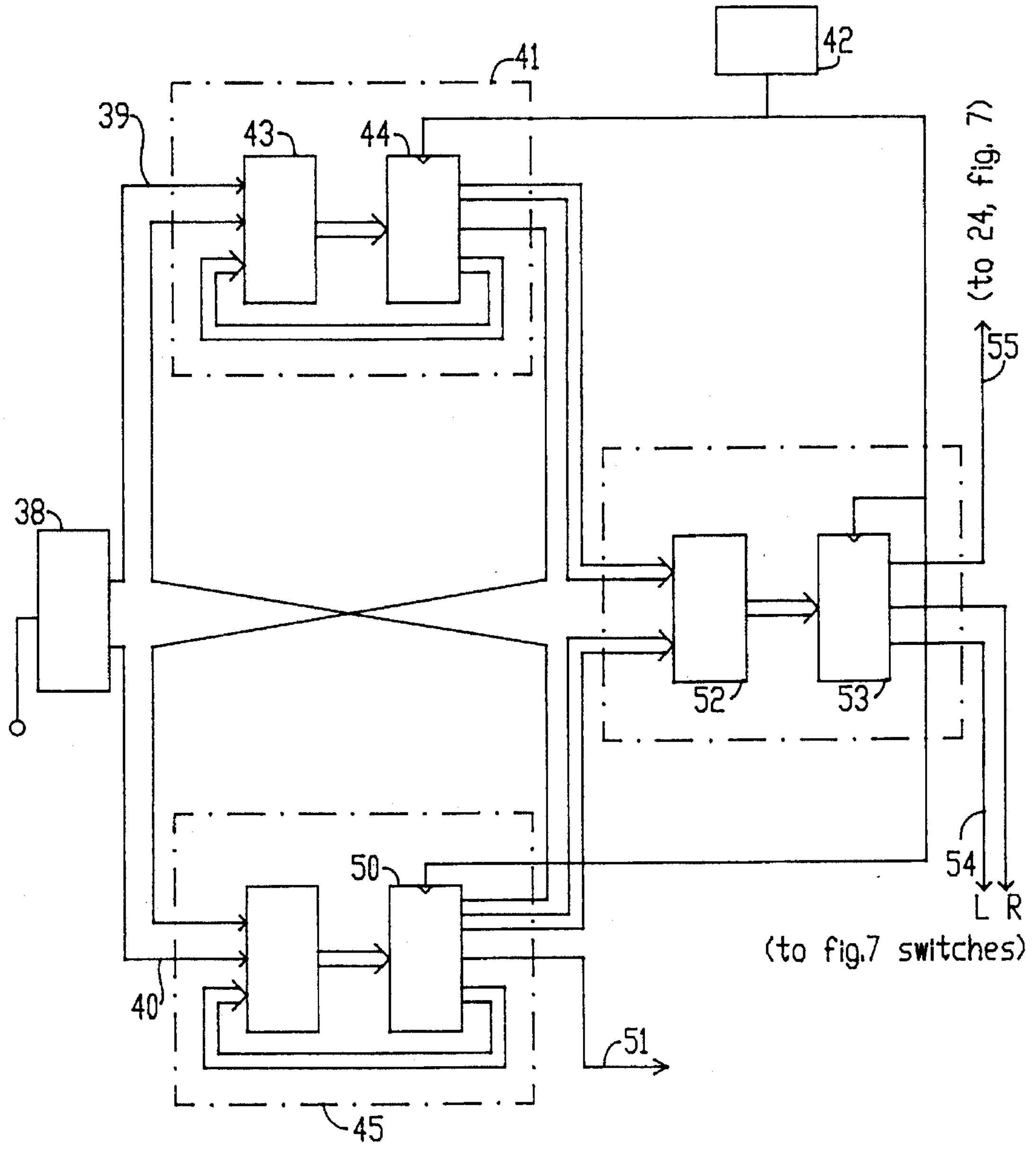
FIG. 9 is a diagram of a channel change detector.
Figure 10:
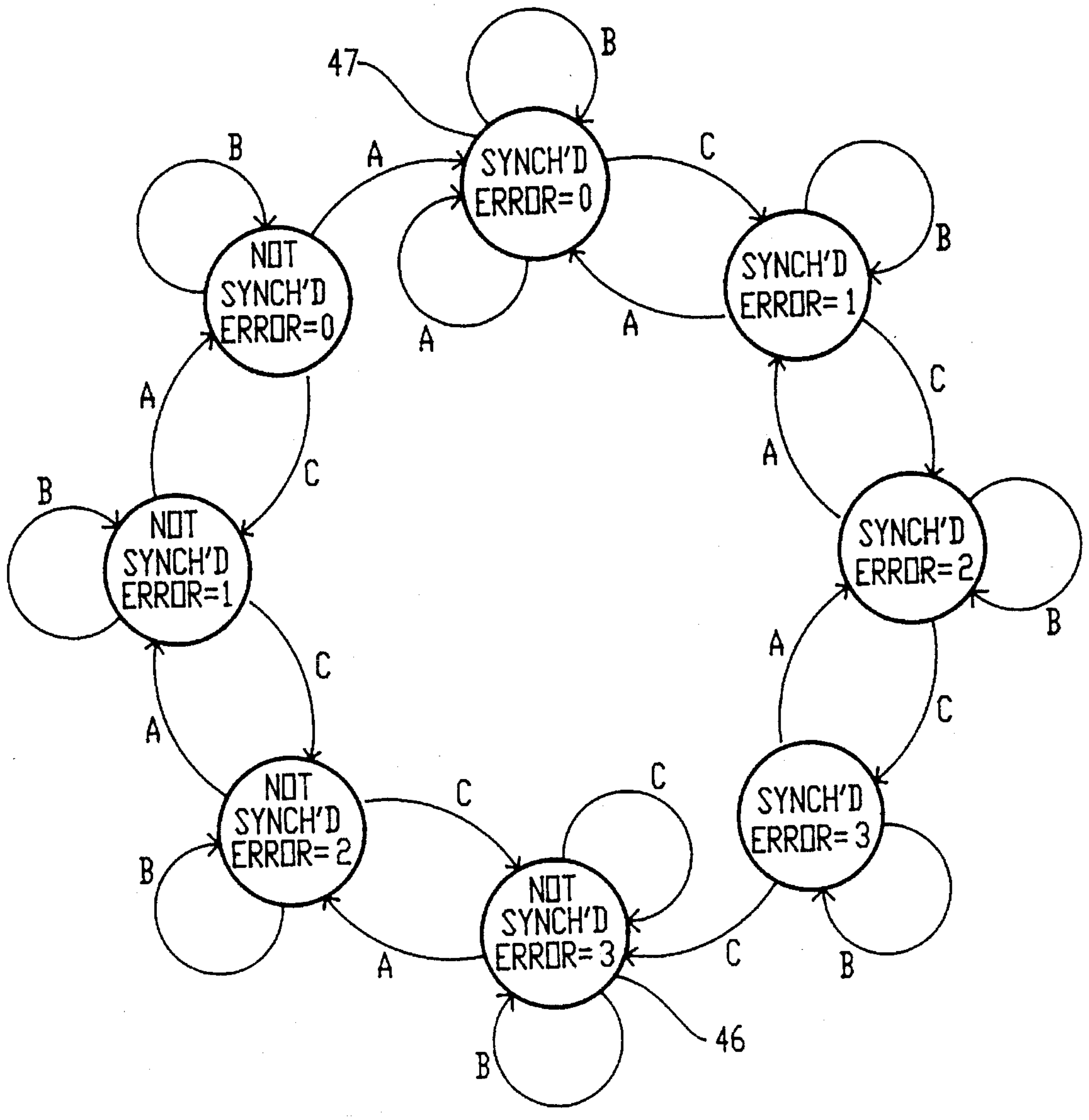
FIGS. 10 and 11 are state diagrams for the detector of FIG. 9.
Figure 11:
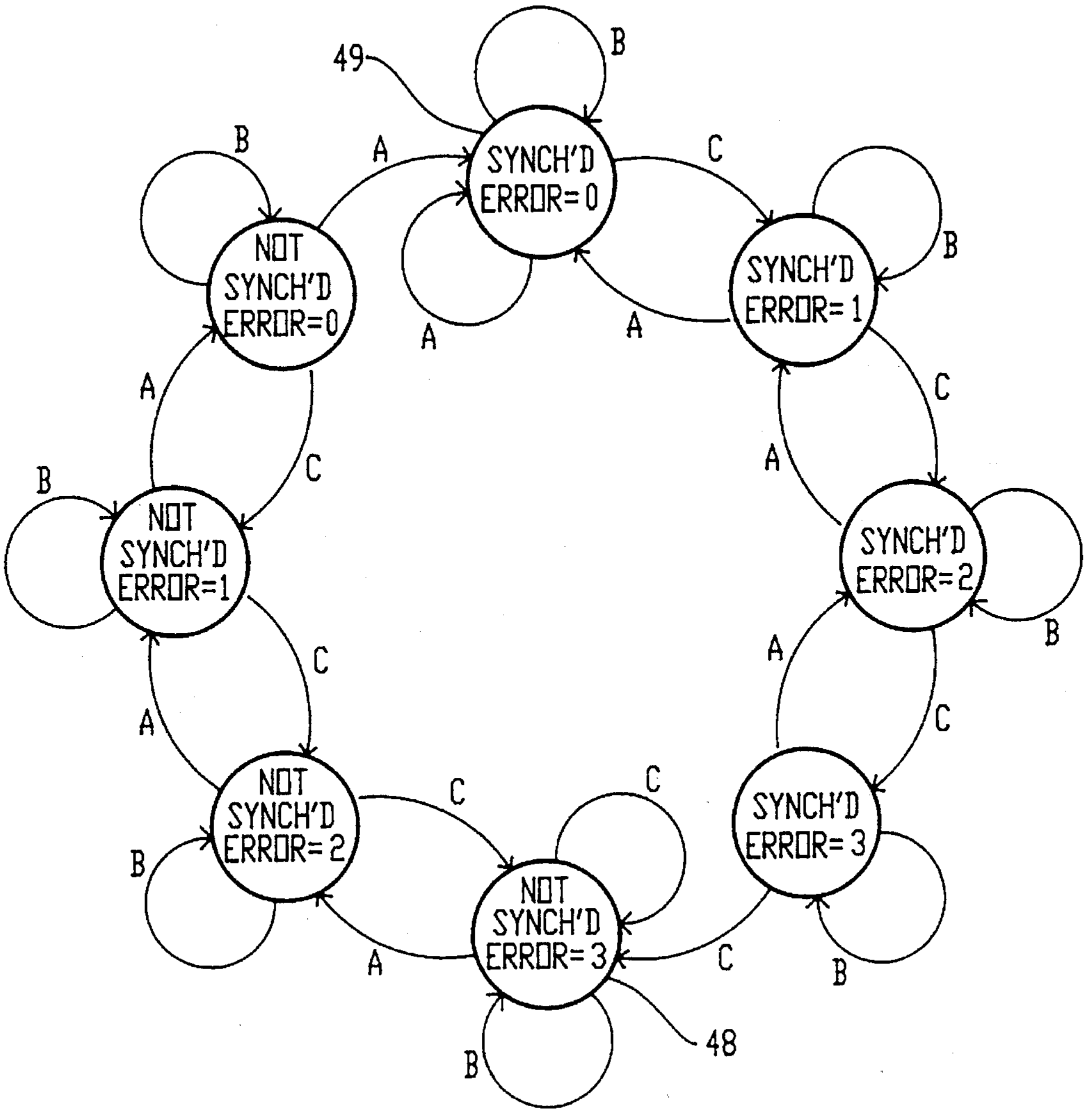

In the preferred embodiment, channel change detection is carried out by a pair of finite state machines—see FIG. 9 for a block diagram, and FIGS. 10 and 11 for associated state diagrams.

A sync separator 38 extracts the line 39 and frame 40 (every other field) sync pulses from the video synchronisation. A line state machine 41 checks the interval between consecutive line synchronising pulses 39 using 6 MHz clock 42 as a timing reference, i.e providing a clock train at a frequency much higher than that of either sync pulse in order to be able to provide an effective, that is relatively high, count between 'synchronised' sync pulses. As shown in FIG. 10, at least four correctly timed intervals are needed to change from the completely unsynchronised state 46 to the completely synchronised state 47. Likewise, at least four wrong intervals are needed to change back again.

'Correct timing' of the interval between line synchronising pulses is relaxed somewhat in the region of the field synchronising pulses to allow for timing errors inherent in domestic-VCR-derived TV signals.

In FIG. 10, state change A occurs if a line sync pulse is detected at the expected time, i.e. a given number of clock pulses after the last sync pulse; state change B occurs if a line sync pulse is detected at approximately the expected time; and state change C occurs if the sync pulse is missing or far from the expected time.

Thus, state machine 41 comprises an EPROM 43 containing sequences of data representing the various states and counts, and a latch 44 driven by the clock 42 to feed back address data to the EPROM 43. Further EPROM address data is provided by the line sync pulses 39 and also by a 'relax timing' bit from frame state machine 45. A portion of each piece of data stored in the EPROM defines a count of clock pulses, whereby the duration between line sync pulses can be monitored and cause the relevant state changes shown in FIG. 10 should the count fall short of or exceed that corresponding to synchronised sync pulses. This count is reset on the arrival of each line sync signal.

Frame state machine 45 checks for the presence of 625 (assuming 625 line 50 Hz TV standard) 'new line' pulses from the line state machine in the interval between consecutive even field synchronising pulses 40. As shown in FIG. 11, at least four frames with the correct number of 'new line' pulses are needed to change from the completely unsynchronised state 48 to the completely synchronised state 49. Likewise, at least four frames with the wrong number of 'new line' pulses are needed to change back again.

In FIG. 11, state change A occurs when 625 new line 'pulses' occur per frame; state change B occurs when approximately 625 'new line' pulses occur per frame; and state change C occurs otherwise.

Accordingly, frame state machine 45 has the same general structure as machine 41, but receives a 'new line' pulse signal from latch 44 as part of its address and delivers from its own latch 50 the 'relax timing' bit and also a 'synchronised' output 51 which defines a channel change. This output is used in the central site equipment to define end of broadcasting by a source.

In summary, a channel-change is said to have occurred (and the sampling sequence is (re-) started) if:

the system is not currently synchronised and 4 frame synchronising pulses are detected with the correct timing (e.g. at switch-on) or;

the system is currently synchronised and 4 consecutive line synchronising pulses or 4 consecutive frame synchronising pulses do not occur at the expected times (e.g. tuning to noise rather than a valid TV signal); or the system is currently synchronised and 4 consecutive line synchronising pulses or 4 consecutive frame synchronising pulses do not occur at the expected time and 4 consecutive frame synchronising pulses are detected with a new correctly-spaced timing (e.g. switching from one signal to another).

The technique described is a compromise between undue sensitivity to noise (causing false reporting of channel changes) and excessive delay in detecting a genuine change.

The device of FIG. 9 also includes means for generating control signals for the switches of FIG. 6 and the latch of FIG. 7. In this respect, it is to be noted that this device of FIG. 9 will be in the in-home equipment and also at the central site. The timing of the control signals will be different, however, to achieve the different sampling rates noted above. The generating means comprises a further EPROM 52 and latch 53 and generates switching signals 54 for the switches and a latch control signal 55 for the latch 24 of FIG. 7.

Returning now to FIG. 8, it is often necessary to determine the audience, not Just to TV broadcasts viewed at the time of transmission, but also to those recorded within the home by the VCR and replayed later.

The conventional approach cannot be employed in conjunction with the described method of programme stream determination, since the channel being recorded is not determined at the time of recording, only subsequently when the data are compared with the reference data. Instead a different technique is used, which additionally leads to a simplification of the equipment connected to the VCR.

The preferred approach is to connect to the VCR the device 27 (FIG. 8) which injects a time and data code into the vertical blanking interval of the video signal within the VCR. This code is inserted ahead of the recording circuitry of the VCR, but after the source selection switching (if any), so as to operate regardless of whether the video signal comes from the internal tuner of the VCR or from an external device connected to it. On playback, the signal bypasses code insertion so that a code already incorporated is not overwritten.

On playback the video signal, complete with time and date code, must find its way to a TV if it is to be watched. Regardless of the route from VCR to TV (direct video connection, modulated UHF signal etc.) the code can therefore be detected by the monitoring equipment connected to the TV by means 31 without requiring any additional connection between the monitoring equipment and the VCR. The monitoring equipment can thus interpret the code and label the sampled data not with the time of viewing but with the time and date of recording. When the derived data are compared with the reference data, stored reference data for that earlier date and time are used, thus allowing the time-shifted material to be identified.

Note that because no direct connection (other than the existing video path) is made between monitoring equipment and time-and-date inserter 27, the clock within the inserter is not synchronised with that of the monitoring equipment and hence that of the base system.

However, when the TV is tuned or switched to the output of the VCR whilst it is in standby or record mode, the monitoring equipment will receive the time-and-date code direct from the inserter, not subject to a record/playback delay. It can therefore keep track of drift of the inserter's clock, and it (or the base computer system) can make the necessary corrections to the time reported off tape.

In other words, if the monitoring equipment at 31 detects a time-date code which, after correction, approximates to current time, then this can be assumed to be direct from the inserter and the correction factor can be refined. Otherwise, the correction factor current at the time and date of the recording must be applied to obtain the true time and date of recording. Moreover, if the means 31 detects a time-date code corresponding, after correction, to current time, then the system knows this is not a recording playback and can stamp the samples with current time and date.

We turn now to data comparison at the central site. This comparison is achieved by means of software in computer 10 and the flow chart of the software can readily be gleaned from the following description.

At the central site the data from each home are compared with the reference data in order to determine which TV programme stream was being watched at any time. The process starts with the data derived immediately following switch-on of the TV, i.e. commencing with a time stamp. At this point the encoded video data from the in-home monitoring equipment is known to start with the data bit derived from the first pair 1 of sample areas in the frame transmitted at the date and time indicated by the associated time stamp.

This data is compared in turn with the first reference data bits derived from the frames transmitted at the time corresponding to the above time stamp in each of the programme streams of interest. In order to allow for offsets between the time stamps of the in-home equipment and those of the central reference-data collection system, the home-derived data is also compared with reference data transmitted up to 2½ seconds earlier and later. Any stream which does not correlate is disregarded in the remainder of the process.

This process is repeated for each of the in-home 32 data bits generated at the higher sampling rate and, if necessary, for the subsequent lower-rate data until, in the usual case, all programme streams are eliminated except one, i.e. the one actually watched in the home. This usually occurs within the first 32 bits, approximately 10 seconds. At this point the time offset for that home will usually have been established to the nearest frame.

Once one programme stream has been so identified and the time offset determined it is then only necessary to compare the home-derived data with the reference data for that one programme stream at that one time offset, thus checking that the TV did continue to display that particular programme stream. This greatly increases the efficiency of the comparison process.

In the usual case, the TV will be found to have stayed so tuned until the point in time where the next channel-change was detected by the in-home equipment and a date stamp is thus found in the data. The above sequence thus re-starts at that point.

Should the identified reference data fail to match the home-derived data after a time, then the comparison process is opened up to include all other reference data streams once more (but not necessarily all time offsets, once the reference-to-in-home time offset has been quantified) until the displayed channel is again uniquely identified. In this case a good approximation to the time of the implicit channel-change is the time of the first data bit (which did not have the corresponding uncertainty bit set) which failed to match.

In the event that all channels are eliminated then it must be concluded that the TV was displaying a programme stream for which no reference data were available.

In the event that more than one programme stream remains (is not eliminated) by the time all the data up to the next known channel-change is examined, then the programme stream viewed cannot be determined uniquely. Except in the case where the next channel-change took place within a few seconds, this is most likely because two or more programme streams contained the same programmes.

Note that the comparison process referred to above is not a simple bit-for-bit comparison. Rather, such a comparison is modified by the confidence bits derived and stored alongside the reference data. In each case where the confidence bit is not set, the result of comparing the home-derived and reference data bits is ignored. Only if the confidence bit is set and the two data bits do not match is that reference programme stream (at that time offset) eliminated.

The efficiency of the process can be increased by comparing data from a given home only with reference data for programme streams that can be received in that particular home, rather than all reference data streams.

Once the programme stream being watched at a particular TV at a particular time has been identified as described above, then the actual programme being watched can be determined conventionally by reference to the programme transmission schedule for that particular programme stream, date and time.

One of the potential benefits of the system over conventional ratings measurement systems is to remove the need to make internal connections to a TV receiver being monitored in the case where the TV receiver has a video output connector. However, this is only possible if the signal available at the connector represents the picture being displayed by the receiver or if the signal that does represent the picture being displayed is available externally and can be identified as such.

This complexity arises because many TV receivers can be switched to display a picture derived from a video input connection, or from one of several such connections, while the video signal available at the output connector continues to be derived from the receiver's aerial input.

In order to determine which signal is being displayed, it is possible to inject a signal into each video input in turn and to determine which, if any, is being displayed by determined if the signal is amplified by the TV in the course of being displayed. In the case of a conventional TV with Cathode Ray Tube display, the high voltages necessary to drive the CRT make it practical to pick up the amplified signals external to the receiver.

Figure 13:
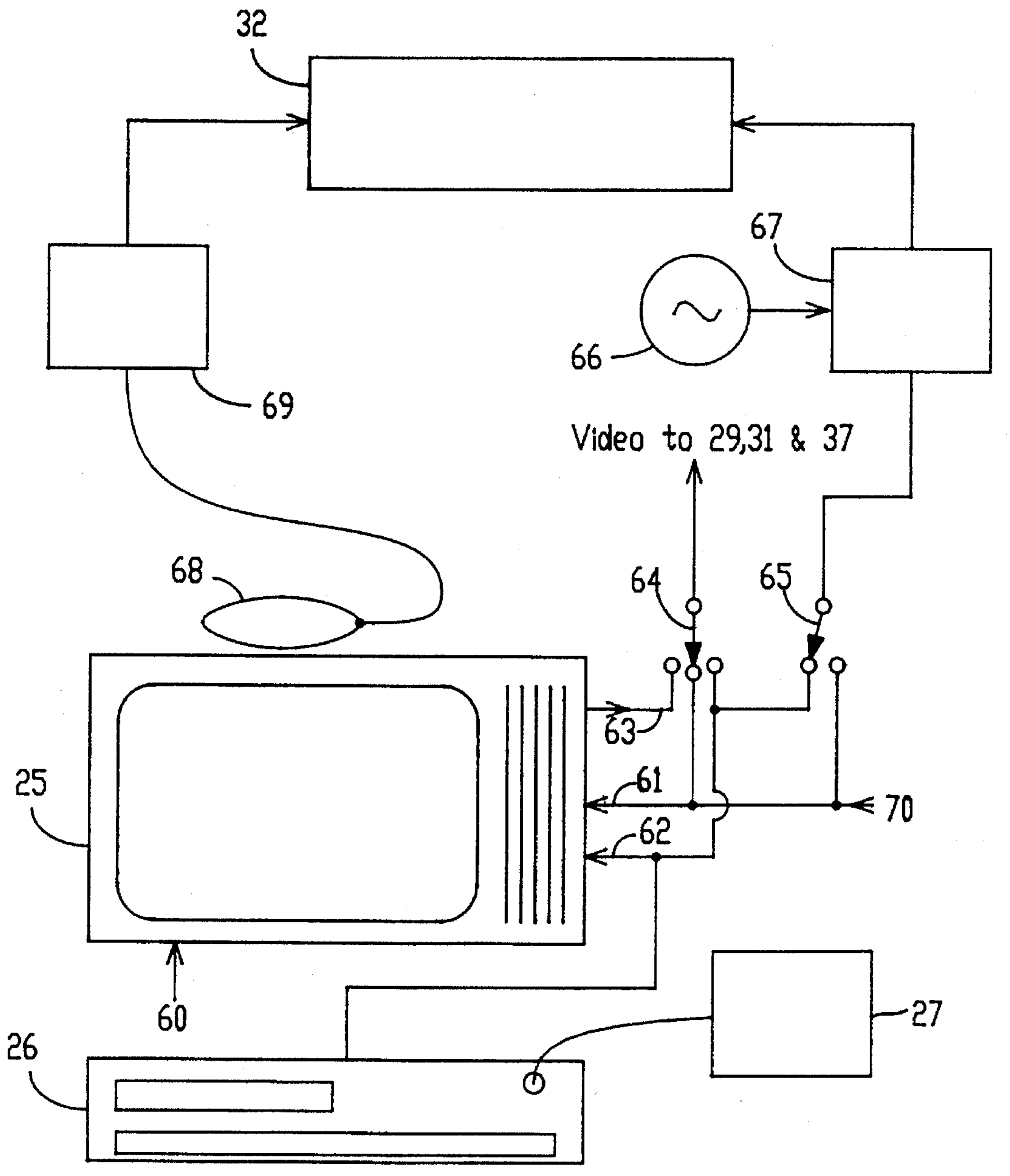
FIG. 13 is a block diagram of that part of the in-home equipment which determines which, if any, external video input to the TV receiver is in use.

Referring to FIG. 13, a TV receiver 25 is shown having an aerial input 60, two video inputs 61 and 62 and one video output 63. Input 62 is derived from VCR 26 and input 61 from another device, such as a video game, 70.

In the preferred embodiment the injected signal is at 3 MHz, and is restricted to one TV line per field just after the vertical blanking interval, namely liens 25 and 338. The signal is generated by an oscillator 66 and modulated with a fixed data pattern by a modulator 67 before being routed via a switch 65 into each video input in turn under the control of microprocessor 32.

If the injected signal is amplified by the TV receiver it is picked up by means of a tuned coil 68 attached to the rear of the receiver, further amplified and demodulated by a receiver amplifier 69, and the recovered data presented to microprocessor 32.

By correlating the demodulated data pattern with the injected data pattern the presence of the injected signal can be detected, even if weak and in the presence of noise.

Figure 14:
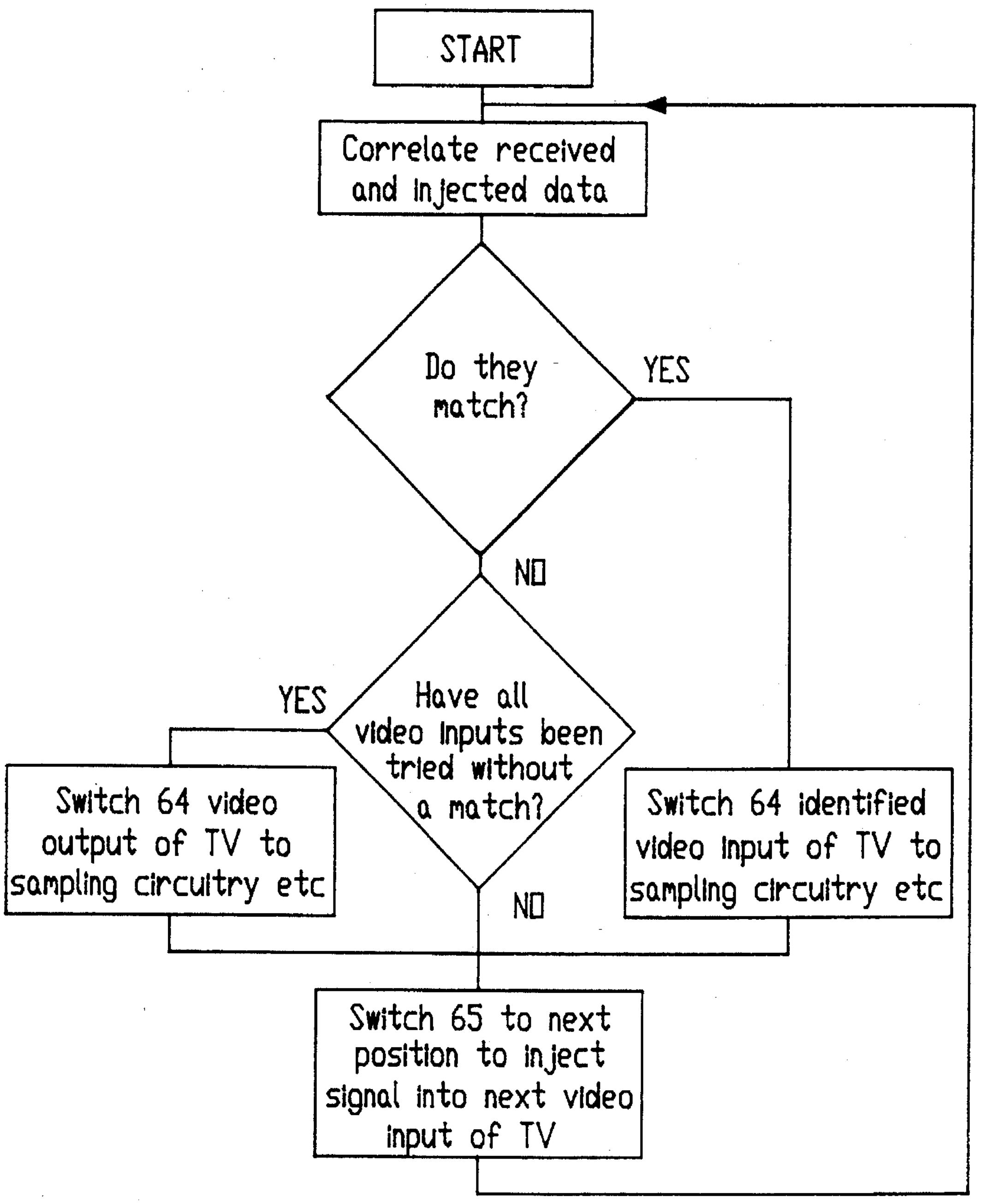
FIG. 14 is a flow chart for the operation of the microprocessor in controlling the circuitry of FIG. 13.

As illustrated in the flow chart of FIG. 14, the microprocessor can determine by this means which, if any, of the external video inputs is being displayed by the TV. By a process of elimination, if none of them is being so displayed, then the display must be derived from the aerial input to the receiver, and is represented by the video signal emanating from video output 63.

Whichever video signal (61, 62 or 63) is determined to be being displayed is routed by the microprocessor 32 via a switch 64 to the sampling circuitry 29, time decoder 31 and channel change detector 37 of FIG. 8 in order to be used in the programme stream identification process previously described.

The choice of carrier frequency and TV line, and the use of a static data pattern, all minimise the visibility of the injected signal.

Individual data patterns can be used to distinguish between signals injected at different TV sets within a home. This voids erroneous results should two TV sets be operated in close proximity.

As an alternative to injecting the signal into each video input in turn, different signals could be injected continuously into each; which was picked up from the TV set would then indicate which was being displayed.

It is often desirable to extend the capabilities of an audience measurement system to collect qualitative data from viewers; typically a rating of 1 to 9 for each programme of interest (to the researcher) watched.

Conventionally this is done by prompting the viewers to rate the programme they are watching (or have just watched), and expecting them to indicate their rating by pressing one of a series of buttons on the monitoring equipment (or related remote control handset). The prompting is often arranged to occur at a predetermined time near the end of the programme of interest, provided the viewer has watched sufficient of the programme. This requires that the in-home monitoring equipment should be able to determine which programme stream is being watched at the expected time of transmission of the programme of interest.

In the case of the present system, the programme stream being viewed is not determined at the time of viewing, but later when the sampled data is compared with the reference data. However, it is possible in one embodiment to download to the in-home monitoring equipment reference data taken in advance from each programme of interest. Comparison of this data with that being collected in the home, by the means already described for the central site, will reveal immediately if the programme of interest is being watched.

Such data may be taken from various scenes in the programme, using a sampling technique similar to that used to collect reference data. These data may be compared (by a method similar to that described above) with those collected to produce the home-derived data. The result of this comparison can be used to determine whether or not a viewer should be prompted to register his rating of that particular programme.

We claim:

1. A method of identifying a programme which has been broadcast to a television receiver location as part of a programme stream and displayed by a television receiver receiving the stream at said location, the method comprising:

(a) at a remote station, monitoring the broadcast programme stream by measuring a predetermined parameter of the stream repetitively and storing the resulting measurements as reference data;

(b) determining and storing as part of said reference data, time data for defining the time of broadcast of those portions of the stream from which said measurements have been obtained;

(c) at the location of the television receiver measuring the same parameter of the displayed programme stream repetitively and at a rate less than that at the remote station, and recording the resultant measurements as local data, (d) determining and recording as part of said local data, time data defining time of receipt at the location of those portions of said displayed programme stream from which said same parameter has been obtained;

(e) transmitting the recorded local data from said location to a remote station; and (f) comparing the transmitted local data with the reference data to identify a correlation therebetween.

2. A method according to claim 1, and comprising comparing each measurement of the transmitted local data with that measurement of said reference data having the same position in the stream and having time data defining substantially the same time as that defined for the measurement of the local data.

3. A method of determining usage of a receiver for selectively receiving a plurality of broadcast programme streams, the method comprising:

(a) providing reference data comprising a sequence of values of a programme stream parameter of a given programme stream, those values relating to known positions throughout a segment of the stream and the reference data including time information defining the times of broadcast of said positions of the stream;

(b) receiving a programme stream at the receiver:

(c) monitoring the programme stream being received by the receiver and making local measurements of said parameter at at least some of said known positions of the programme stream being monitored;

(d) recording local time data defining the time of broadcast of each stream position relating to the local measurements; and (e) comparing each local measurement with that one of said measurements of said reference data having the same position in the stream and substantially the same time of broadcast to identify a correlation therebetween.

4. A method according to claim 2 in which, when the receiver receives a programme stream in real time, the time of receipt of the displayed programme stream is used at step (d) to define the time of receipt.

5. A method according to claim 2 and comprising the step of transmitting the displayed programme stream to the receiver via a recording device, and the step of producing at the recording device time data to define time of receipt at said recording device as the time of receipt.

6. A method according to claim 5 and comprising the steps of:

determining whether or not the time data produced at the recording device defines a time which is substantially the same as current time; and substituting the time defined at the recording device to define said time of receipt when the time defined at the recording device said current time are not substantially the same.

7. A method according to claim 6, wherein when the time defined at the recording device and current time are substantially the same, any difference is used to correct said time which is substituted.

8. A method according to claim 1 and comprising the step of downloading at the receiver location the reference data relating to the part of the stream corresponding to the programme and, at that location, seeking the correlation, thereby to define which programme is being viewed at the receiver.

9. A method according to claim 1 wherein step (a) comprises obtaining said reference data for a plurality of programme streams, and the method further comprises:

carrying out steps (c) and (d) at a plurality of television receiver locations for comparison with the reference data later; and carrying out step (f) by comparing at a central site the results of the correlation with a programming schedule for identification of the stream viewed.

10. A method according to claim 2, wherein the programme stream is constituted by regularly occurring sections and the measurement positions are defined in relation to the beginning of each section.

11. A method according to claim 10, wherein the time data recorded at said location comprises the section beginning times rather than the times of the portions of said displayed programme stream measured within a section.

12. A method according to claim 10, wherein the programme streams are television programme streams incorporating a video signal defining television screen images.

13. A method according to claim 12 wherein the parameter is a function of the average intensity of those portions of said video signal which, at a receiver, define a given screen area.

14. A method according to claim 13, wherein the area in each case has a predetermined position in each of a field and a frame of said video signal.

15. A method according to claim 14, wherein the parameter measurements are processed to define as a parameter value the result of a comparison of signal portions corresponding to two distinct areas of the screen image.

16. A method according to claim 15, wherein relative luminance is obtained as the parameter of each said area, i.e. the average luminance of that area compared to the average luminance of another area of the screen image.

17. A method according to claim 16 and comprising measuring the average luminance of two of said areas, comparing measured luminance of the two areas to define which of said two areas has the greater luminance thus to define one of two "greater than" states, and providing binary information defining which of the two "greater than" states exists.

18. A method according to claim 17, wherein the luminance comparing step comprises detecting values that are within a given range and flagging said detected values, the comparison of step (f) ignoring any correlation or lack of correlation in relation to such results.

19. A method according to claim 18, wherein only the reference data has its measurements flagged.

20. A TV programme stream encoding process for encoding a TV video signal comprising stream sections defined by TV sync signals, the process comprising;

(a) the step at a central data collection site of measuring a programme stream property at each of a set of known, but irregularly spaced, positions throughout a stream section defined by the TV sync signals, (b) said set being measured in each section at the central data collection site to define that programme stream, there being n measurements per section;

(c) the step of providing time-of-receipt data from which the time-of-receipt pertaining to each measurement can be obtained; and (d) carrying out steps (a) and (c) at a local receiver at which the stream is displayed using a lesser measurement rate of n/x measurements per section, averaged over a plurality of said sections, where x is relatively large compared with n.

21. A method according to claim 20 and comprising the step of switching x between two values, one much less than the other, but both much larger than n.

22. A method according to claim 21, and comprising the step at the location of the receiver of monitoring channel change, and the step of reducing the measurement rate at the location of the receiver from a predetermined instant after detection of a channel change.

23. A method according to claim 22, and comprising the step of selecting the lesser value of x on a detected channel change and, after one full section, the step of switching x to the larger value.

24. A method according to claim 23, and comprising the step of monitoring the time intervals between TV sync signals and for determining a channel change in dependence upon change of time interval between sync signals.

25. A method according to claim 24, wherein there is more than one video input at said receiver location, the method further comprising injecting a distinct signal into each video input, looking for the presence of said distinct signal in the displayed stream to identify the stream being displayed, and using the identified stream for measurement in step (d).

26. A method according to claim 1, wherein there is more than one programme stream input at the receiver location, the method comprising the step of injecting a distinct signal into each programme stream input, the step of looking for the presence of the distinct signal in the displayed stream to identify the stream being displayed, and the step of using the identified stream for measurement in step (c).

27. A method according to claim 26, wherein the looking step comprises a wireless technique for looking for the distinct signal.

28. A method according to claim 27, wherein the injecting step comprises injecting the distinct signal in turn into the programme stream inputs.

29. A method according to claim 27, wherein the injecting step comprises injecting different distinct signals simultaneously into respective programme stream inputs.

30. A system for identifying a programme displayed by a television receiver comprising:

(a) means at a remote station for monitoring a programme stream by measuring a predetermined parameter of the stream repetitively and storing the resulting measurements as reference data;

(b) means at said remote station for obtaining time data defining the time of receipt the remote station of those portions of the stream from which said measurements are obtained and for storing said time data as part of said reference data;

(c) means at the location of the television receiver for measuring the same parameter of the displayed programme stream repetitively and at a rate less than that at the remote station, and for recording the measured parameters and time data defining time of receipt at said location of those portions of said displayed programme stream from which the said same parameters are obtained;

(d) means for transmitting the measurements and time data from said location to a remote station; and (e) means for comparing the transmitted measurements and time data with the reference data to identify a correlation therebetween.

31. A system according to claim 30, and comprising means for comparing each of the transmitted measurements with that measurement of the reference data having the same position in the stream and time data defining substantially the same time of receipt.

32. A system for determining usage of a receiver for selectively receiving a plurality of broadcast programme streams, the system comprising:

(a) means for providing reference data comprising a sequence of values of a programme stream parameter of a given programme stream, those values relating to known positions throughout a segment of the stream and the reference data including time information defining the times of broadcast of the said positions of the stream;

(b) means for monitoring a programme stream when being received by the receiver and for making local measurements of said parameter at at least some of said known positions of said monitored programme stream;

(c) means for recording time data defining the time of broadcast of each stream portion relating to the local measurements; and (d) means for comparing each of the local measurements with that one of said measurements of said reference data having the same position in the stream and substantially the same time of broadcast to identify a correlation therebetween.

33. An apparatus, for encoding a programme stream which comprises a video signal defining television receiver screens, comprising means for defining n distinct screen positions of a segment of the stream, and means for measuring the signal of the stream to define values corresponding to selected ones of said screen positions so as to collect a sequence of substantially complete sets of n values corresponding to respective ones of the n positions, where, on average over the sequence, there are n values every x segments, where x is not less than n.

34. An apparatus for monitoring a receiver coupled to a combination receiving and recording device for receiving a transmission comprising a programme stream, the apparatus comprising:

means for encoding the programme content of said programme stream during its receipt;

timing means for including current time-of-receipt data in the encoded data;

insertion means for coupling to the device to insert into the signal received by the device device time-of-receipt data so that the device time-of-receipt data will be recorded with any recording of the signal; and means for deactivating the inclusion of the current time-of-receipt data in the encoded data when earlier device time-of-receipt data is found in a signal from the recording device so that the data extracted will include original time-of-receipt data.

35. An apparatus according to claim 34 wherein the device comprises recording circuitry and source selection switching means, and the insertion means is coupled upstream of said recording circuitry of the device but downstream of said source selection switching means of the device so that insertion occurs in all signals except those played back.

* * * * *